United States Patent [19]

Haven

[11] 4,335,328
[45] * Jun. 15, 1982

[54] SELECTIVELY ERASABLE STORAGE TARGET WITH INSULATED WEB COLLECTOR

[75] Inventor: Duane A. Haven, Banks, Oreg.

[73] Assignee: Tektronix, Inc., Beaverton, Oreg.

[ * ] Notice: The portion of the term of this patent subsequent to Mar. 3, 1998, has been disclaimed.

[21] Appl. No.: 236,489

[22] Filed: Feb. 23, 1981

Related U.S. Application Data

[63] Continuation-in-part of Ser. No. 42,172, May 24, 1979, abandoned, which is a continuation-in-part of Ser. No. 6,146, Jan. 24, 1979, abandoned.

[51] Int. Cl.³ .................... H01J 29/39; H01J 31/08
[52] U.S. Cl. ..................................... 313/395; 313/398
[58] Field of Search ............................. 313/395, 398

[56] References Cited

U.S. PATENT DOCUMENTS

| | | | |
|---|---|---|---|
| 3,293,474 | 12/1966 | Gibson, Jr. | 313/398 |
| 3,339,099 | 8/1967 | Anderson | 313/398 |
| 3,594,607 | 7/1971 | Frankland | 313/398 X |
| 3,611,000 | 10/1971 | Johnston | 313/398 X |
| 3,710,173 | 1/1973 | Hutchins et al. | 313/398 X |
| 3,978,366 | 8/1976 | Steele | 313/398 |
| 3,982,150 | 9/1976 | Mossman | 313/398 |
| 4,139,800 | 2/1979 | Ostermeier et al. | 313/398 X |
| 4,159,439 | 6/1979 | Haven et al. | 313/398 |
| 4,185,227 | 1/1980 | Morris | 313/395 X |
| 4,254,360 | 3/1981 | Haven | 313/395 |

*Primary Examiner*—Palmer C. Demeo
*Attorney, Agent, or Firm*—John D. Winkelman

[57] ABSTRACT

An improved bistable storage target structure for a cathode-ray tube includes a faceplate-supported transparent target electrode covered by a transparent insulating layer. Overlying the insulating layer is an apertured web collector electrode and a storage component of secondary emissive material formed by a plurality of phosphor deposits disposed within the web apertures. A patterned layer of insulating material is provided overlying the web electrode to isolate the phosphor deposits from the collector electrode.

12 Claims, 6 Drawing Figures

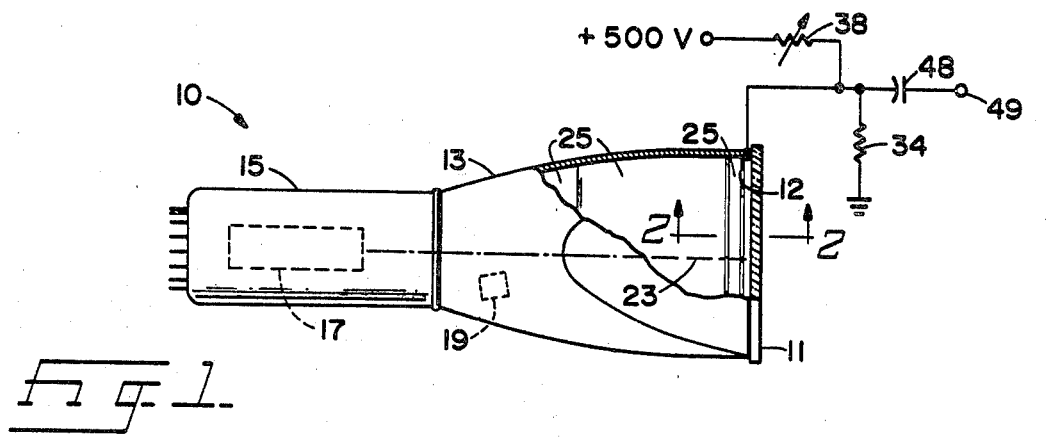
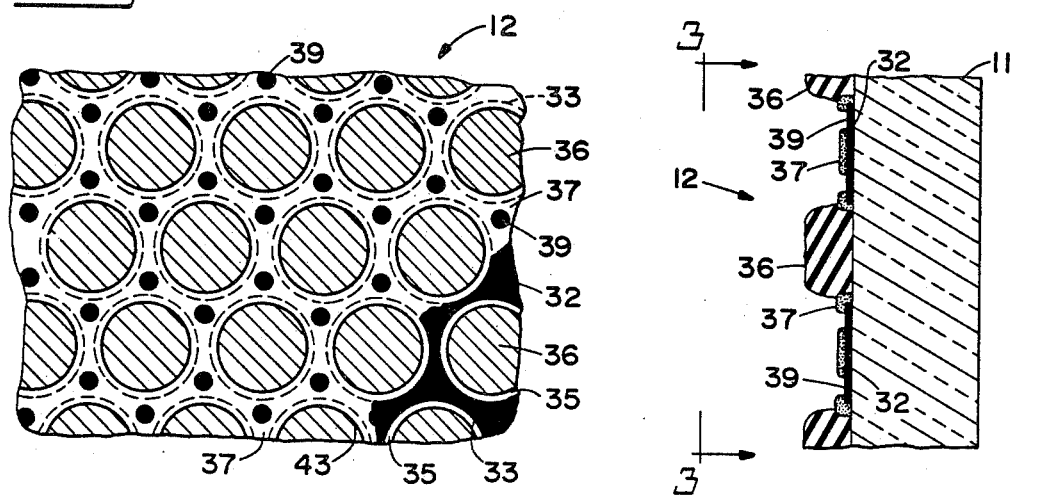
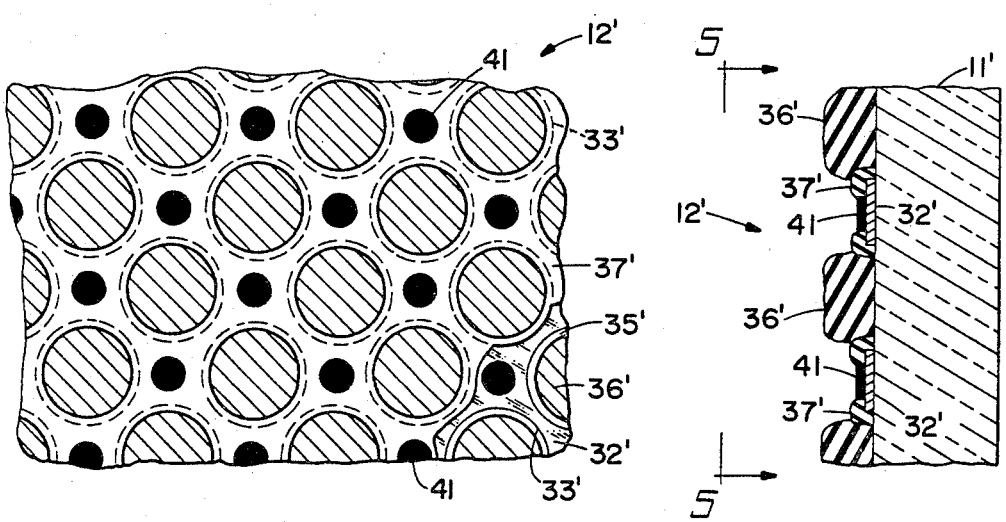

SELECTIVELY ERASABLE STORAGE TARGET WITH INSULATED WEB COLLECTOR

CROSS-REFERENCE TO RELATED APPLICATIONS

This is a continuation-in-part of application Ser. No. 42,172, filed May 24, 1979, which was a continuation-in-part of application Ser. No. 6,146 filed Jan. 24, 1979, both now abandoned.

BACKGROUND AND OBJECTS OF THE INVENTION

The present invention relates generally to cathode-ray storage tubes, and more particularly to an improved storage target structure for such tubes.

U.S. Pat. No. 3,293,474, issued Dec. 20, 1966 to Charles B. Gibson, Jr. and assigned to the assignee of the present invention, discloses a storage target construction that includes a mesh-like collector electrode formed on one side of an insulating support plate. Deposits of a bistable storage material, suitably a phosphor of the P-1 type, are disposed in the openings of the electrode and isolated from one another by the mesh-like conductor.

In the commercially produced embodiment of the Gibson, Jr. target—i.e., the one shown in FIG. 2 of the above-mentioned patent—the deposits of phosphor storage material physically contact the conductive mesh. This causes an undesirable effect known as "rim-lighting" during operation of the target in a storage CRT. Rim-lighting is characterized by a halo or ring of light surrounding storage phosphor deposits in the unwritten or background areas of the target. The resulting increase in background luminance significantly reduces display contrast and impairs the viewability of displayed information.

Several explanations for rim lighting have been advanced. One is that the surface of each unwritten phosphor deposit somewhat attains a surface charge that decreases with distance from the deposit's interface with the collector electrode. (As is understood, the collector normally is maintained at a potential several hundred volts higher than the CRT's flood gun cathodes.) At some distance D from the interface, the deposit's surface potential is equal to the first crossover voltage for the phosphor, i.e., the voltage at which its secondary emission ratio $\delta$ is unity. The surface potential for regions of the phosphor lying between the collector interface and point D thus will be above first crossover ($\delta<1$), and flood gun electrons will tend to charge those regions in a positive direction—i.e., toward collector potential. However, at distances greater than D from the collector/phosphor interface, the surface of the deposit will be below first crossover ($\delta<1$) and those regions will be charged in the opposite direction toward flood gun cathode potential—typically 0 volts. As a result, each phosphor deposit will include a positively charged peripheral region that remains in a luminous or "written" state whenever the CRT is operated in a storage mode.

It might seem that rim-lighting could be avoided by making the phosphor deposits slightly smaller than the mesh apertures so that they do not contact the collector electrode, but this has not proved to be effective unless a relatively large separation is created. Thus, in the version of the Gibson, Jr. target shown in FIG. 4 of the patent, rim-lighting would be observed unless the depth of cavities 66 was significantly increased or the thickness of the phosphor storage dielectric layer 36' was reduced a corresponding amount. Both alternatives are unattractive, particularly from a manufacturing standpoint.

The problem of rim-lighting has been addressed in a different type of storage target—one of the raised "dot" collector type—by providing each conductive dot with a collar of insulating material. Thus, as shown in U.S. Pat. No. 4,159,439, issued June 26, 1979 to Duane A. Haven et al. and assigned to the assignee of the present invention, all but the outermost end of each raised collector member is coated with an insulating material to isolate the collector structure from the surrounding phosphor storage layer. While generally effective in minimizing rim-lighting, the process used to apply the insulating collars is not well suited for use in commercial manufacturing operations.

Storage targets of the type described above are generally erased by applying a negative pulse to the collector structure. Capacitive coupling between the collector and storage phosphor drops the written areas of the target below the first crossover, after which the flood gun electrons complete the erasure. The collector voltage is then raised to normal operating potential at a rate slow enough for flood gun action to hold the storage phosphor below first crossover. As will be understood, the erasure process affects all areas of the target having a common collector electrode—usually the entire target or a major portion of it. This is a significant drawback in certain applications, since there is no way to erase a selected portion of a stored image without also easing other information one may wish to retain.

U.S. Pat. No. 3,611,000, issued Oct. 5, 1971 to Kent H. Johnson and assigned to the assignee of the present invention, describes a method of selectively erasing a bistable storage target that includes a layer of storage phosphor disposed atop a target electrode, and a separate collector electrode in contact with the phosphor layer on the side opposite the target electrode. Targets having such a structure are the subject of U.S. Pat. Nos. 3,594,607, issued July 20, 1971 to Roger A. Frankland and 4,185,227, issued Jan. 22, 1980 to Robert W. Morris, both assigned to the assignee of the present invention. A storage target having separate coplanar interdigitated target and collector electrodes for selective erasure is described in U.S. Pat. No. 4,139,800, issued Feb. 13, 1979 to Bruce H. Ostermier et al. and also assigned to the assignee of the present invention. The Frankland target is difficult to manufacture because the storage layer must be highly uniform in thickness, and the collector electrode is produced by vacuum deposition through a mask. The phosphor deposits of the Morris and Ostermier et al. targets are in contact (or near-contact) with their collector electrodes, making them subject to rim-lighting.

The present invention has as its principal object the provision of improved storage targets of the type that include an apertured web collector electrode.

A more specific object of the invention is to provide an improved storage target of the Gibson, Jr. type having minimal background luminance.

A still more specific object of the invention is to provide a storage target of the type that includes an apertured web collector and a discontinuous layer of secondary emissive material formed by a plurality of phosphor deposits disposed within the web apertures, wherein a layer of an insulating material overlying the collector web isolates the phosphor deposits to minimize rim-lighting.

Another object of the invention is to provide an insulated web collector storage target capable of selective erasure of stored information.

A related object of the invention is to provide an insulated web collector storage target structure that includes separate, electrically isolated target and collector electrodes.

A further object of the invention is to provide an improved insulated web collector storage target capable of displaying stored information in a color that contrasts with that of the background.

Still a further object of the invention is to provide an improved insulated web collector storage target capable of displaying stored information in a color that differs from that of displayed but unstored (i.e., "write-through") information.

BRIEF DESCRIPTION OF THE DRAWINGS

The above and other objects, features and advantages of the present invention will become apparent as the following detailed description of its preferred embodiments is read in conjunction with the accompanying drawings, wherein:

FIG. 1 is a simplified, partially cross-sectional side view of a direct viewing storage tube incorporating the improved target structure of the present invention, the tube being shown with certain associated circuitry;

FIG. 2 is a fragmentary cross-sectional view on an enlarged scale showing an insulated web collector storage target according to one embodiment of the invention;

FIG. 3 is a view taken along line 3—3 in FIG. 2 showing the rear surface of the improved storage target;

FIGS. 4 and 5 are views corresponding to those of FIGS. 2 and 3, respectively, showing on an enlarged scale an alternative embodiment of the invention.

DETAILED DESCRIPTION

Figure 6:
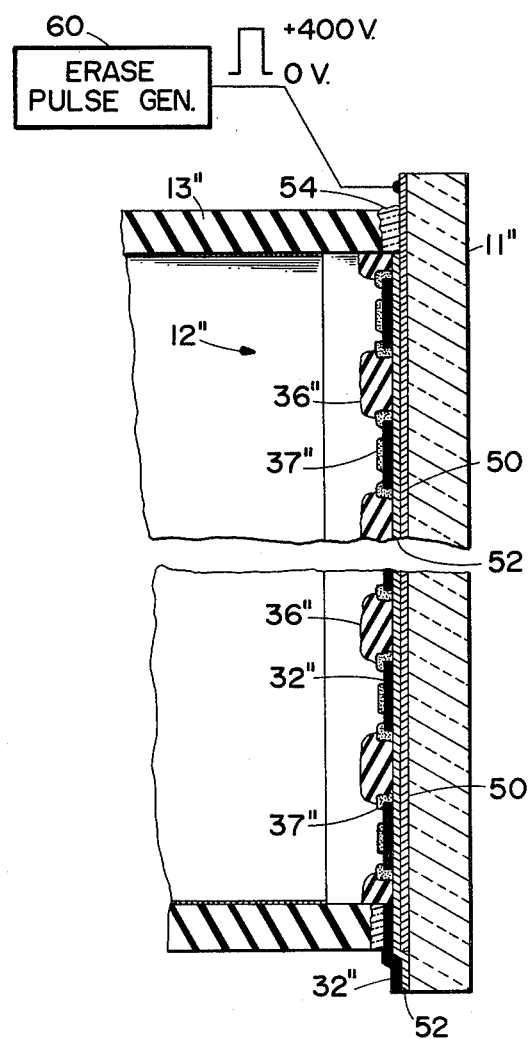
FIG. 6 is a fragmentary cross-sectional view showing a selectively erasable storage target according to a further embodiment of the invention.

Referring now to the drawings, and first to FIG. 1, a direct viewing bistable storage CRT 10 is shown to include an evacuated envelope comprising a transparent faceplate 11, a funnel-shaped body portion 13 and a tubular neck portion 15. Supported on the inner, or rear, surface of faceplate 11 is a storage target 12 constructed in accordance with the present invention. CRT 10 additionally includes a writing/reading electron gun 17 mounted within neck portion 15, and one or more flood guns 19. Electron gun 17 may be operated in a conventional manner to produce either a writing or a reading beam 23 of relatively high energy electrons directed at target 12, with suitable means (not shown) being provided to deflect the beam over the rear surface of the target as desired. Flood guns 19 are employed to bombard storage target 12 with relatively low energy electrons.

A plurality of electrodes are provided intermediate flood guns 19 and target 12 for focusing and collimating the low energy electrons. These electrodes may be in the form of spaced coatings, or bands, 25 of a conductive material, and function to distribute the flood gun electrons substantially uniformly over the rear surface of the storage target.

One embodiment of storage target 12 is shown in FIGS. 2 and 3 to include an apertured web, or mesh, electrode 32 provided as a patterned film or coating of a conductive material on an insulating support surface, suitably the rear surface of faceplate 11. Electrode 32 may be formed of a transparent conductive material, such as a thin film of tin oxide, or an opaque conductive material such as aluminum, gold, nickel, chromium or Nichrome, a nickel-chromium alloy. For economy of manufacture, a metal film such as Nichrome is preferred.

As best shown in FIG. 3, electrode 32 includes a multiplicity of apertures 33 arranged in a desired array or pattern and exposing support surface areas 35 within which are located deposits 36 of a material capable of bistable storage. An apertured layer 37 of an insulating material overlies the electrode web. The insulating layer, which serves both to isolate deposits 36 from electrode 32 and to define collector areas 39, includes a first pattern of openings 43 substantially in registration with web apertures 33 and a second pattern of openings exposing areas 39 on the surface of electrode 32. As will be understood, openings 43 are of a smaller diameter than apertures 33, and the insulating layer thus overlaps the edges of the web apertures to form a ring of insulating material on the portion of the support surface area 35 surrounding each deposit 36.

The material of which deposits 36 are formed suitably is a conventional storage phosphor material, such as P-1 type phosphor ($Zn_2SiO_4$:Mn), a rare earth-activated rare earth phosphor such as terbium-activated lanthanum oxysulfide ($La_2O_2S$:Tb), or an admix of P-1 phosphor with a rare earth oxide or oxysulfide or a rare earth-activated rare earth oxide or oxysulfide as described in U.S. Pat. No. 4,110,659 issued Aug. 29, 1978 to William M. Mason et al. Because deposits 36 are in the form of separated areas or dots that are insulated from the collector electrode structure, even relatively conductive phosphors such as P-31 may be used as the storage material.

To provide a high contrast target—i.e., one with minimal rim-lighting—insulating layer 37 suitably is formed of a nonluminescent dielectric material, preferably one having a relatively high secondary emission ratio ($\delta$), such as aluminum oxide, thorium oxide, silica, or the like. Aluminum oxide and thorium oxide are particularly preferred. An enhanced writing rate is provided by the use of high $\delta$ insulating material. This is because the insulating material will reach a rest potential equivalent to the collector electrode voltage more quickly than the storage phosphor when addressed by the writing electron beam. However, since the insulating material adjoins the phosphor deposits, the latter will be quickly pulled up to the same rest potential by capacitive coupling.

In other applications of the insulated web collector storage target structure, layer 37 may be formed of a dielectric phosphor material. For example, to provide a vivid color difference between the background and image elements of a stored display, a target 12 may be produced in which the insulating layer is a storage phosphor that emits light of a color significantly different from that of phosphor deposits 36. Background areas of the display thus will be of one color—that produced by rim-lighting of the layer 37 phosphor in the regions surrounding deposits 36—while stored image areas will be of a contrasting color resulting from the combined emissions of the phosphors forming layer 37 and deposits 36. Such a target may, for instance, suitably include deposits 36 of $La_2O_2$:Tb, a green-emitting storage phosphor, and an insulating layer 37 of europium activated yttrium oxysulfide ($Y_2O_2S$:Eu), which has a red phosphoresence. The red- and green-emitting phosphors combine to produce yellow-green images of stored information on a red background.

In a "write-through" mode of bistable storage tube operation, such as that described in U.S. Pat. No. 3,430,093 issued Feb. 25, 1969 to C. Norman Winningstad, a charge image may be displayed but not stored at the same time that another, stored charge image is displayed. Conventional, single phosphor storage targets display the stored and write-through (non-stored) images in the same color, typically green. Color differences between the two types of images can be provided by another variation of the insulated web collector storage target structure, one in which the insulating layer is formed of a non-storing phosphor that emits light of a different color and that has a lower emission efficiency under flood gun illumination conditions than the storage phosphor of deposits 36. For example, layer 37 can be a rare earth-activated rare earth oxide or oxysulfide, such as $Y_2O_3$:Eu or $YVO_4$:Eu, that has been "surface killed", and deposits 36 can be P-1 type phosphor. In such a target, stored images will be green in color and write-through images will appear orange.

An alternative embodiment of an insulated web collector storage target 12' according to the present invention is shown in FIGS. 4 and 5. In this embodiment, an apertured web electrode 32' is formed of a transparent conductive material such as tin oxide. The collector areas of the target are defined by dot-like deposits 41 of a nontransparent conductive material such as gold or Nichrome. As in the previously-described embodiment, the insulating material of layer 37' extends into web apertures 33' and engages the portion of support surface 35' surrounding each phosphor deposit 36'.

It will be understood that the patterns, configurations and relative sizes of storage deposits and collector areas may be varied widely depending on the intended use of the storage target and the materials and processes available for their manufacture. For example, the structural arrangement shown in FIGS. 2 and 3 is suitable when a display with high contrast and high written luminance is desired. In the version illustrated, the deposits 36 of storage material cover about 70% of the total target area, insulating layer 37 covers about 20% and the collector areas 39 occupy about 10% as viewed in FIG. 3. The arrangement shown in FIGS. 3 and 4 is preferred when a color write-through target is desired (one in which the insulating layer is a nonluminescent phosphor with different color and low voltage efficiency characteristics than the storage phosphor). In this application, a higher insulator/phosphor area ratio is desirable. The version illustrated in FIG. 5 has about 50% of the total area covered with storage phosphor, insulating layer 37' covers about 40% and collector areas 41 occupy about 10%. The transparent web electrode also covers about 40% of the target area.

A further embodiment of an insulated web collector storage target according to the invention—one adapted for selective erasure of stored information—is shown in FIG. 6. Target 12" is similar to previously-described target 12 (FIGS. 2 and 3), but additionally includes a separate target, or erase, electrode 50 on the rear surface of faceplate 11". Electrode 50 suitably is a continuous, transparent film of a conductive material, such as tin oxide or indium-tin oxide. Covering electrode 50 is a thin, transparent layer 52 of an insulating material, such as aluminum oxide, silicon oxide or silicon dioxide. Mesh electrode 32", apertured insulating layer 37" and storage phosphor deposits 36" are disposed on layer 52 overlying target electrode 50. As will be evident, the transparent insulating layer serves to isolate collector electrode 32" and phosphor deposits 36" from the target electrode.

The target electrode film extends through a seal 54 provided between the faceplate and funnel portion 13 of CRT 10 to enable electrical connection to a conventional voltage pulse generator 60. Generator 60 supplies rectangular pulses of suitable amplitude and duration to the target electrode to enable selective erasure of stored information in a manner to be described. Mesh electrode 32" also extends through the seal as shown for connection to a suitable DC operating potential.

A storage target of the type shown in FIGS. 2 and 3 may be fabricated in the following manner: A thin, opaque layer of a conductive material such as gold, nickel or Nichrome is deposited on the cleaned rear surface of CRT faceplate 11 in a suitable manner—e.g., by sputtering or vacuum deposition. Next, a coating of a photosensitive etch resist is applied to the conductive layer and exposed through a mask having a pattern of light transmissive areas corresponding to the desired pattern of apertures 33 in web electrode 32. After developing the exposed resist coating, the uncovered areas of the underlying metal layer are removed using an appropriate etchant. Removal of the patterned resist coating (typically by washing in acetone or other suitable solvent) completes formation of an apertured web electrode 32 on faceplate 11. The process continues with the application of another coating of photoresist to the web-bearing faceplate. Next, the photoresist coating is exposed through a second mask having a pattern of light-transmissive areas corresponding to the locations of collector areas 39 in target 12. Development of the exposed resist coating produces a pattern of photoresist "dots" covering the collector areas on apertured electrode 32. The faceplate then is immersed in an electrolyte solution (suitably a solution of aluminum or thorium nitrate in isopropanol) containing small, positively-charged particles of an insulating material—e.g., aluminum oxide or thorium oxide—in suspension. When a negative potential is applied to the web electrode, the suspended particles migrate to it and adhere to any unprotected areas (i.e., areas not covered by the previously-formed photoresist dots). The insulating material is deposited to a thickness of at least one micron, and preferably 2-5 microns, forming a layer 37 that covers the edges of electrode apertures 33. Phosphor deposits 36 are next formed using standard photographic deposition techniques. For example, a wet slurry layer composed of a suitable phosphor (100 g.), polyvinyl alcohol (100 g.) ammonium dichromate (20 g.) isopropanol (1 ml.) and water (100 ml.) is applied to the insulated web electrode-bearing faceplate and exposed to actinic light directed through the front surface of faceplate 11. The light passes through the openings in electrode 32 and insulating layer 37 to polymerize portions of the slurry layer overlying the uncovered regions of the faceplate's rear surface. Finally, the unexposed (and hence unpolymerized) portions of the slurry layer are washed away by a water rinse, and the faceplate is baked at a temperature sufficiently high to remove the photoresist dots and the organic binder present in the polymerized phosphor material.

A target 12' of the type shown in FIGS. 4 and 5 may be made as follows: A thin, transparent conductive film, suitably of tin oxide or the like, is applied to the clean rear surface of faceplate 11' in a conventional manner. Over the tin oxide film is deposited an opaque layer of Nichrome or other suitable metal. Next, both conductive layers are sequentially etched through a conventionally-formed photoresist mask to provide an array of apertures 33' in the transparent film and overlying metal layer. The mask is removed, and an array of photoresist dots is formed on the metal layer at the sites where collector deposits 41 are to be defined. Deposits 36' of a storage phosphor are then formed on the uncovered faceplate surface within apertures 33' by standard photodeposition techniques. As will be understood, the phosphor deposits are smaller in diameter than the apertures in which they are formed, and do not contact the conductive film. The portions of the opaque layer not protected by photoresist next are removed using a etchant that will not attack the underlying transparent conductive layer. This step results in the formation of collector "dots" 41, which remain covered with photoresist. Finally, an insulating layer 37' of finely divided dielectric phosphor particles is electrophoretically deposited on the exposed areas of the transparent apertured web forming electrode 32', after which the faceplate is baked to eliminate the remaining organic binders and photoresist. As noted above, if the target is intended for differential color write-through operation, the dielectric phosphor particles of layer 37' will be surface killed or otherwise pre-treated to substantially reduce or prevent them from luminescing when bombarded by low energy (flood gun) electrons. A color contrast target can be provided by the use of phosphor particles that are not surface killed.

A storage target adapted for selective erasure of stored information—target 12" in FIG. 6, for example—may be produced by first applying a transparent, conductive film of tin oxide or indium-tin oxide to the cleaned rear surface of faceplate 11". Methods for the deposition of such films are well known. Next, a thin, transparent layer 52 of an insulating material is formed on the conductive film in a suitable manner, such as by vacuum deposition. The insulating layer may consist of $Al_2O_3$, SiO or $SiO_2$ deposited to a thickness of about one micron. Fabrication of target 12" is then completed following the procedure described above for target 12 (FIGS. 2 and 3), with insulating layer 52 serving as the support surface. As will be understood, a selectively erasable target structure similar to that of target 12' (FIGS. 4 and 5) may be produced in an analogous manner.

For operation of target 12 (or 12'), apertured web electrode 32 (32') is connected to a DC voltage established across a load resistor 34 (FIG. 1) by a variable resistor 38 connected between the load resistor and a suitable DC source. As will be understood, the voltage applied to web electrode 32 (32') normally is within the "stable range" of target voltages over which phosphor deposits 36 (36') will store a charge image, typically 150–120 volts. For a comprehensive description of storage tube operation, reference may be made to U.S. Pat. No. 3,293,473 to Robert H. Anderson. Electrical readout of stored charge images may be obtained in a known manner using readout signals coupled to output terminal 49 by a capacitor 48 connected to the junction of resistors 34 and 38. The high contrast characteristic of the insulated web collector target provides superior hard copies of stored information.

Selectively erasable versions of the insulated web collector targets—target 12", for example—may be operated in a manner similar to that of targets 12 and 12'. Target (erase) electrode 50 is held at a potential of 0 volts for writing information on the target and for displaying the stored information. Erasure of stored information may be accomplished in several ways. For example, if erasure of the entire target is desired, a conventional erase pulse may be applied to web electrode 32" while holding the potential of target electrode 50 at 0 volts. For faster complete erasure, an erase pulse can be applied to both electrodes.

Erasure of stored information on a selective basis is accomplished according to the teachings of previously-mentioned U.S. Pat. No. 4,139,800. Flood guns 19 are disabled (turned off) and a positive voltage pulse is applied to electrode 50 by activating generator 60. The amplitude of this erase pulse must be sufficient to raise the potential of unwritten areas of the target above collector potential—the potential applied to web electrode 32". Electron gun 17 is then activated and the area of the target to be erased is bombarded with electrons from beam 23. Written areas of the target addressed by the beam are charged down toward collector potential, the bombardment being continued for a length of time sufficient to bring the addressed areas below first crossover when the target electrode voltage is returned to zero. Following termination of the erase pulse (after gun 17 has been turned off), flood guns 19 are again activated to charge the unwritten and erased portions of the target to flood gun cathode potential (0 volts) and to hold the unerased, written areas at collector potential.

While the best mode presently contemplated for practicing the invention has been described and several modifications suggested, it will be apparent to those skilled in the art that various other changes may be made without departing from the teachings set forth herein. The scope of the present invention thus is to be determined only by reference to the following claims.

I claim as my invention:

1. A bistable storage target for a cathode-ray tube, comprising
    an electrically conductive layer forming a first electrode,
    a first layer of electrically insulative material having a support surface,
    a second, mesh electrode of conductive material disposed on said support surface, said electrode being substantially insulated from said first electrode and including a first pattern of openings,
    a storage component of secondary electron emissive material in contact with said support surface, said component comprising a multiplicity of spaced deposits of such material within the openings of said first pattern, and
    a second layer of insulating material overlying said mesh electrode, said second layer including a second pattern of openings substantially in register with said first pattern, the individual openings of said second pattern being smaller in size than corresponding openings of said first pattern, with portions of said second insulating layer engaging regions of said support surface surrounding said deposits of storage material and insulating them from said mesh electrode.

2. A bistable storage target for a cathode-ray tube, comprising
- a first layer of electrically conductive material,
- a second layer of electrically insulative material disposed overlying said first layer and including a support surface,
- a third apertured layer of conductive material disposed on said support surface, said third layer being insulated electrically from said first layer and including a plurality of openings in a first pattern,
- a storage component of secondary electron emissive material in contact with said support surface, said component comprising a multiplicity of spaced deposits of such material disposed within the openings of said first pattern, and
- a fourth, apertured layer of insulating material overlying said third layer, said fourth layer including a like plurality of openings forming a second pattern substantially in register with said first pattern, the individual openings of said second pattern being smaller in size than the corresponding openings of said first pattern, with portions of said fourth layer engaging regions of said support surface surrounding said deposits of storage material and insulating them from said third layer.

3. The storage target of claim 2, wherein said fourth insulating layer includes a third pattern of openings delimiting portions of said third layer at locations intermediate the openings of said first pattern.

4. The storage target of claim 3, wherein said delimited portions are coated with a conductive material different from that of said third layer.

5. The storage target of claim 2, wherein said first and second layers are substantially transparent.

6. The storage target of claim 2, wherein said storage component comprises a phosphor material.

7. The storage target of claim 6, wherein said fourth layer comprises another phosphor material having a perceived color emission different from that of the storage component phosphor material.

8. The storage target of claim 6, wherein said fourth layer comprises a non-storing phosphor material that emits light of a different perceived color and that has a lower emission efficiency under flood gun electron bombardment that the storage component phosphor material.

9. The storage target of claim 6, wherein said fourth layer material has a secondary electron emission ratio ($\delta$) exceeding that of said storage component material.

10. A cathode-ray tube that comprises a bistable storage target, means for generating a beam of relatively high velocity electrons directed toward said target and for deflecting said beam over a surface of said target to write a charge image thereon, and means for flooding said surface with relatively low velocity electrons to cause bistable storage of said charge image, characterized in that said target comprises
- an electrically conductive layer forming a first electrode,
- an electrically insulative layer having a support surface,
- a first pattern layer of conductive material on said surface, said first pattern layer being insulated electrically from said electrically conductive layer and including a first array of apertures,
- a second pattern layer of insulating material overlying said first pattern layer, said second pattern layer including a second array of apertures disposed substantially in register with said first array, the individual apertures of said first array being smaller than the corresponding apertures of said first array, portions of said second pattern layer overlapping the edges of the first array apertures and contacting said support surface to define insulated sites for the location of charge image storage elements, and
- a multiplicity of deposits of secondary electron emissive storage material on said support surface, including one at each of said sites.

11. The cathode-ray tube of claim 10 wherein said second pattern layer further includes a third array of openings delimiting regions of said first pattern layer at locations intermediate the apertures of said first array.

12. The cathode-ray tube of claim 11, wherein said delimited regions remain uncovered thereby to facilitate collection of secondary electrons by said first pattern layer.

* * * * *

UNITED STATES PATENT AND TRADEMARK OFFICE
CERTIFICATE OF CORRECTION

PATENT NO. : 4,335,328

DATED : June 15, 1982

INVENTOR(S) : Duane A. Haven

It is certified that error appears in the above—identified patent and that said Letters Patent is hereby corrected as shown below:

Col. 1, line 40, reads "somewhat" should be --somehow--.

Col. 1, line 51, reads "($\partial$ <1)" should be --($\partial$ >1)--.

Signed and Sealed this

Twenty-fourth Day of August 1982

[SEAL]

Attest:

Attesting Officer

GERALD J. MOSSINGHOFF

Commissioner of Patents and Trademarks